United States Patent [19]

Hegler et al.

[11] Patent Number: 5,320,797
[45] Date of Patent: Jun. 14, 1994

[54] METHOD AND APPARATUS FOR THE CONTINUOUS MANUFACTURE OF A COMPOUND PIPE WITH A PIPE SOCKET

[75] Inventors: Ralph-Peter Hegler, Bad Kissingen; Wilhelm Hegler, Goethestrasse 2, D-873o Bad Kissingen, Fed. Rep. of Germany

[73] Assignee: Wilhelm Hegler, Fed. Rep. of Germany

[21] Appl. No.: 28,394

[22] Filed: Mar. 9, 1993

[30] Foreign Application Priority Data

Mar. 31, 1992 [DE] Fed. Rep. of Germany ....... 4210482

[51] Int. Cl.$^5$ .................................. B29C 49/04
[52] U.S. Cl. .................... 264/511; 264/40.3; 264/40.7; 264/508; 264/515; 264/173; 425/133.1; 425/336; 425/393; 425/396; 425/140; 425/532; 425/462
[58] Field of Search ............... 264/511, 508, 505, 516, 264/173, 506–507, 515, 40.3, 40.7; 425/133.1, 462, 327, 396, 393, 532, 233, 336, 140

[56] References Cited

U.S. PATENT DOCUMENTS

| | | |
|---|---|---|
| 3,743,456 | 7/1973 | Cini . |
| 3,976,414 | 8/1976 | Hegler et al. . |
| 3,996,323 | 12/1976 | Hegler et al. . |
| 4,145,387 | 3/1979 | Hegler et al. . |
| 4,492,551 | 1/1985 | Hegler et al. . |
| 4,500,284 | 2/1985 | Lupke ........................ 425/336 |
| 4,710,337 | 12/1987 | Nordström .................. 264/508 |
| 4,770,618 | 9/1988 | Lupke ..................... 425/133.1 |
| 4,846,660 | 7/1989 | Drossbach . |
| 4,865,797 | 9/1989 | Järvenkylä .................. 264/508 |
| 4,936,768 | 6/1990 | Lupke ....................... 425/532 |
| 5,123,827 | 6/1992 | Lupke ..................... 425/133.1 |
| 5,124,109 | 6/1992 | Drossbach .................. 264/508 |
| 5,141,427 | 8/1992 | Hegler et al. . |
| 5,186,878 | 2/1993 | Lupke ....................... 425/336 |

FOREIGN PATENT DOCUMENTS

| | | |
|---|---|---|
| 0096957 | 12/1983 | European Pat. Off. . |
| 0108598 | 5/1984 | European Pat. Off. . |
| 0385465 | 9/1990 | European Pat. Off. . |
| 2164845 | 3/1973 | Fed. Rep. of Germany ...... 425/327 |
| 2403618 | 8/1975 | Fed. Rep. of Germany . |
| 46-9674 | 3/1971 | Japan ........................ 264/508 |
| 60-124240 | 7/1985 | Japan ........................ 425/327 |
| WO8805377 | 7/1988 | PCT Int'l Appl. . |
| WO9014208 | 11/1990 | PCT Int'l Appl. . |

*Primary Examiner*—Jeffery Thurlow
*Attorney, Agent, or Firm*—Laff, Whitesel, Conte & Saret

[57] ABSTRACT

For the continuous manufacture of a compound pipe with a pipe socket including a smooth internal tube and an external tube provided with transverse grooves and welded together with the latter, an external tube and an internal tube are extruded, the latter into the external tube. While the normal compound pipe is manufactured, gas is blown at a slight overpressure into the space beteen the external tube and the internal tube. When the pipe socket is produced, this space is vented so that a full-surface bearing of the internal tube against the external tube is achieved, to which end the internal tube is acted upon from its inside by gas under pressure.

14 Claims, 7 Drawing Sheets

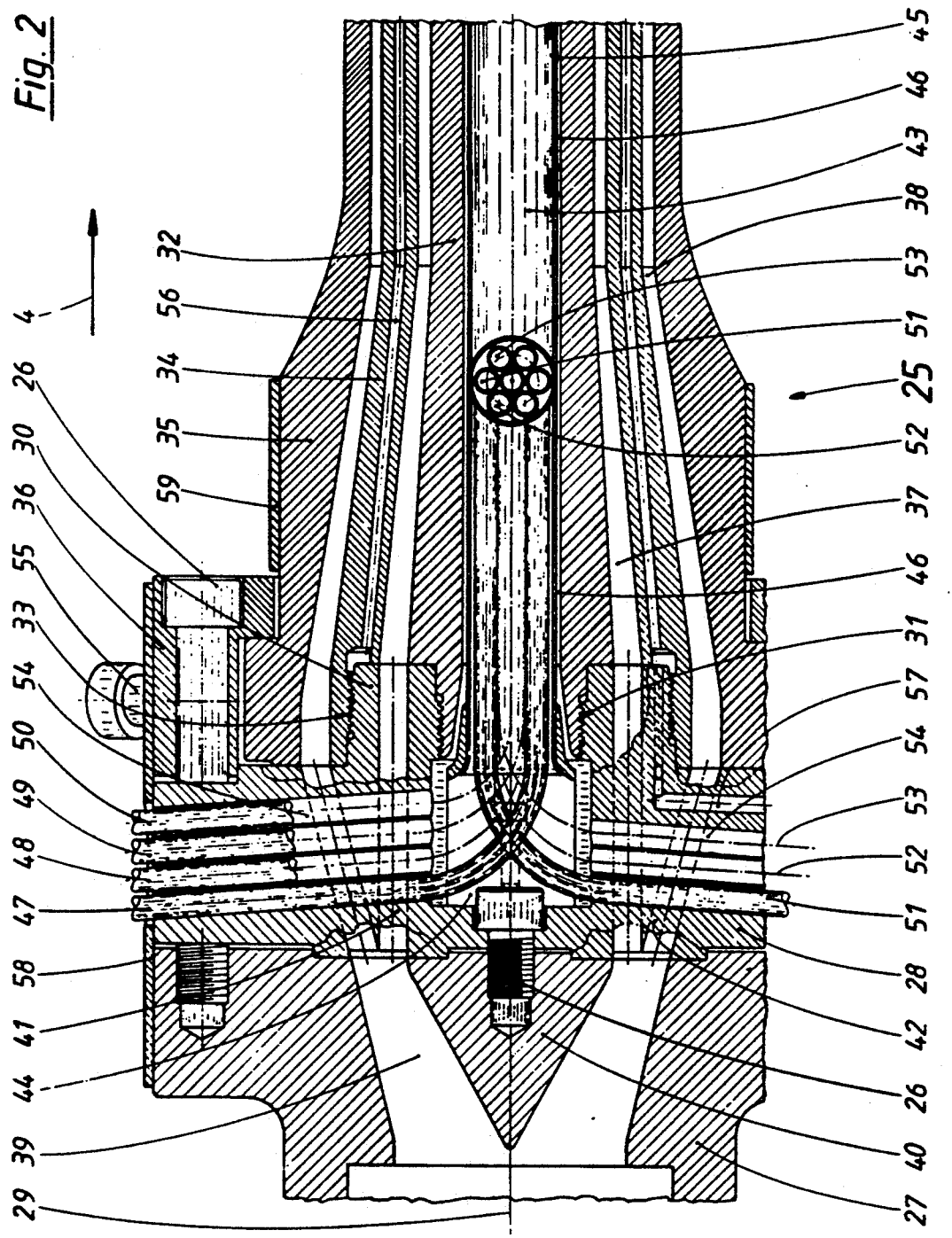

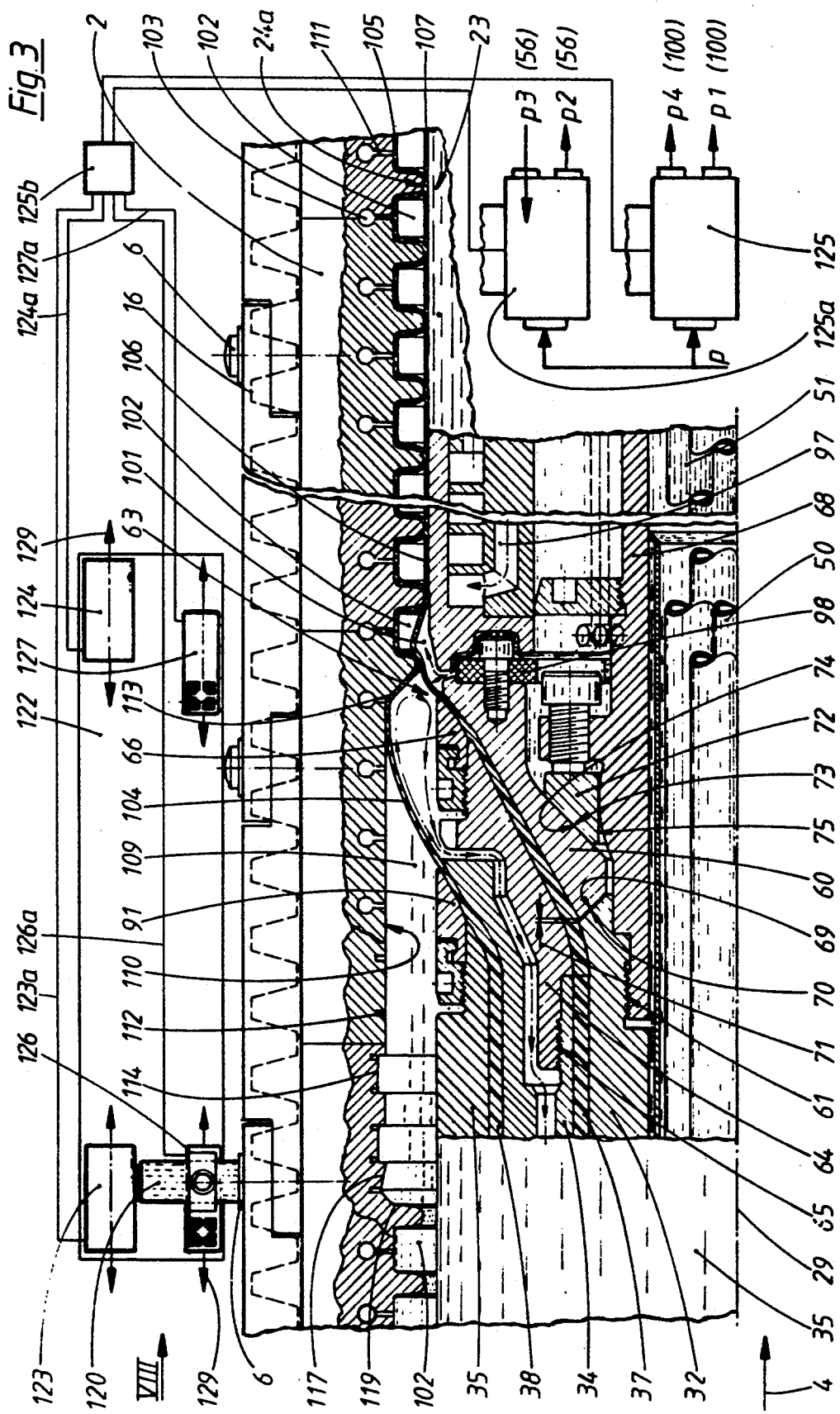

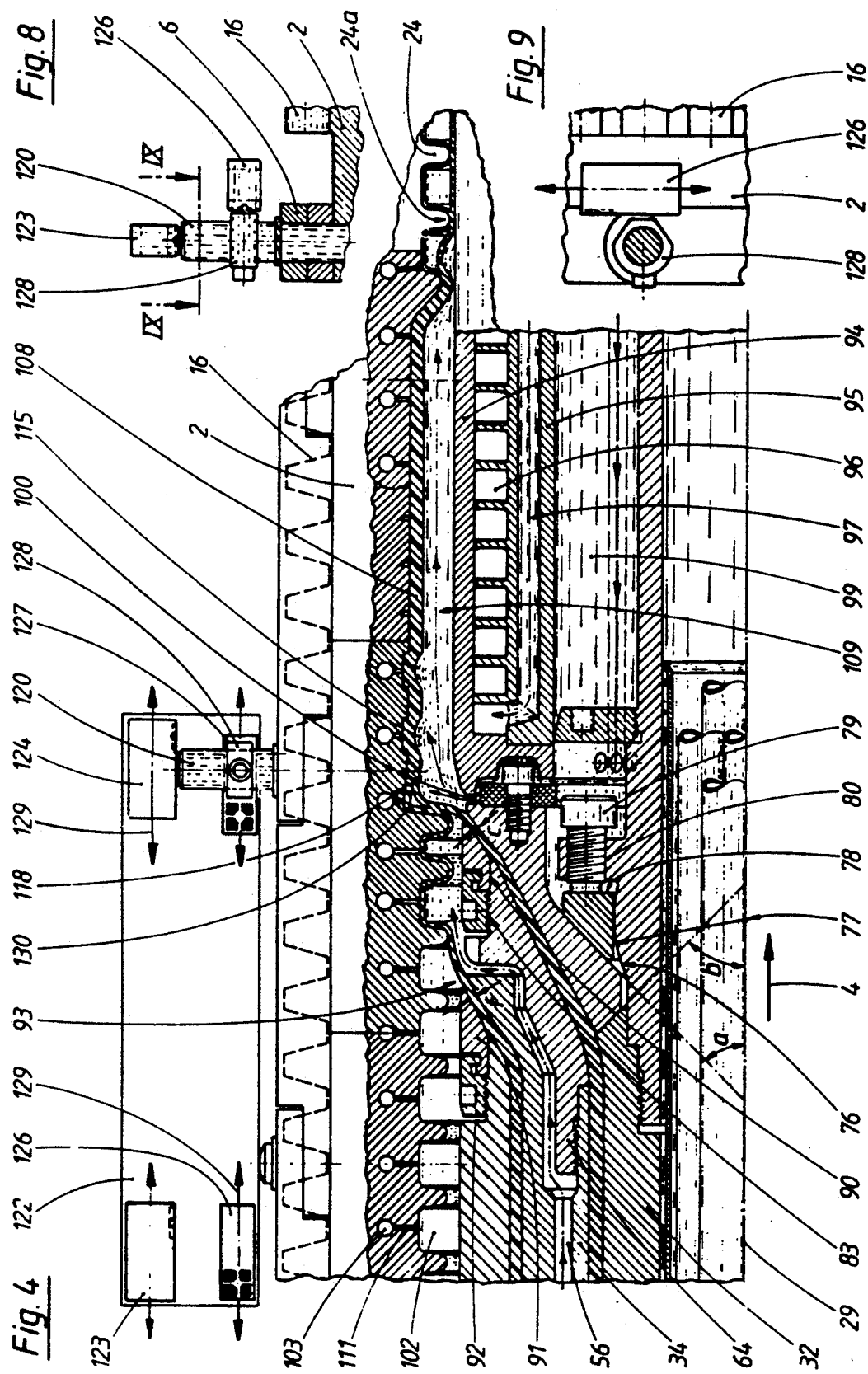

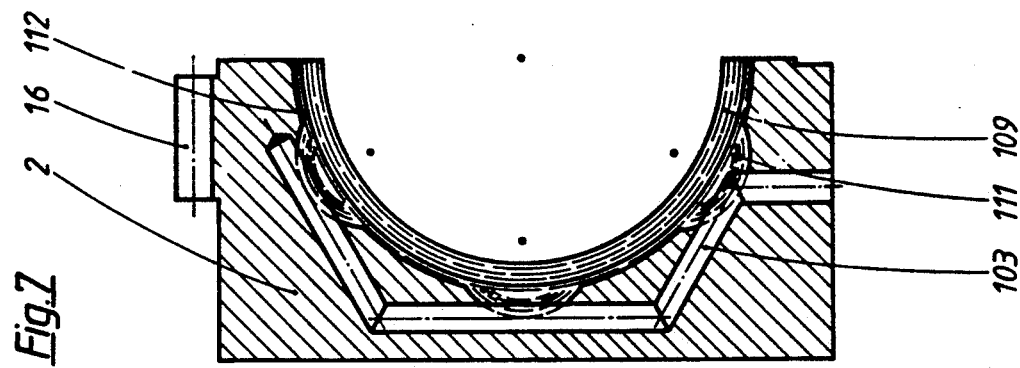
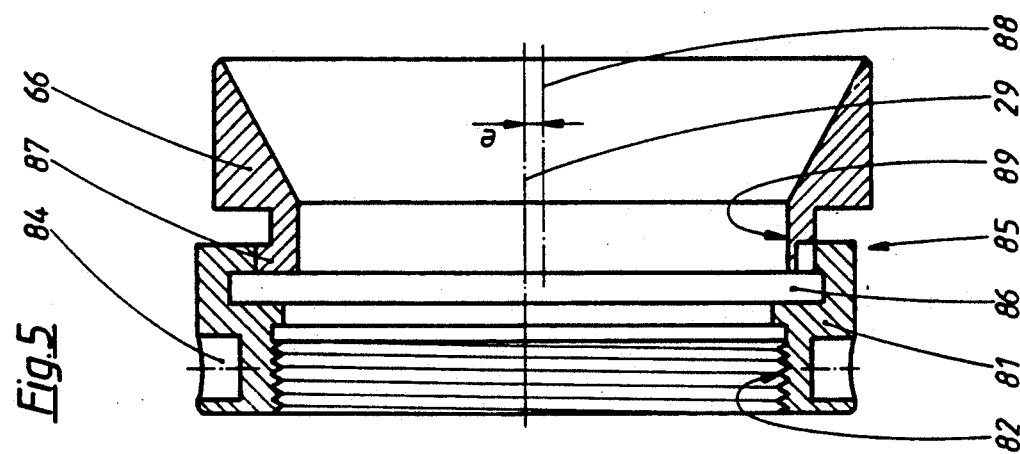
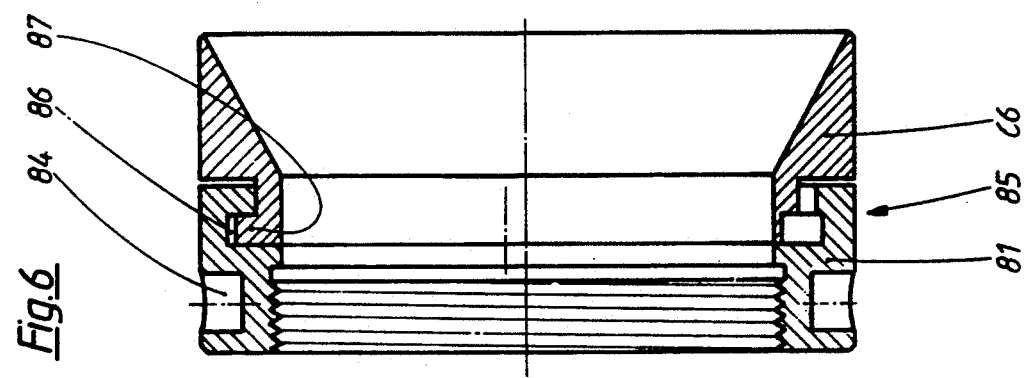

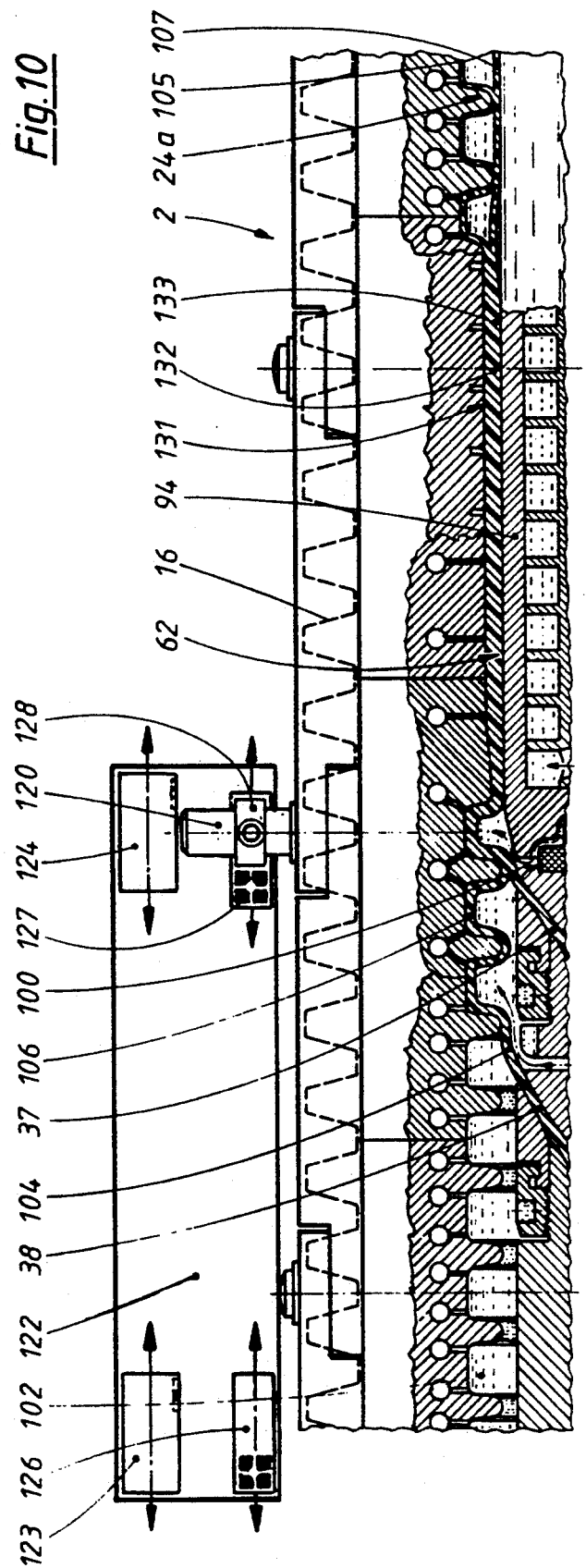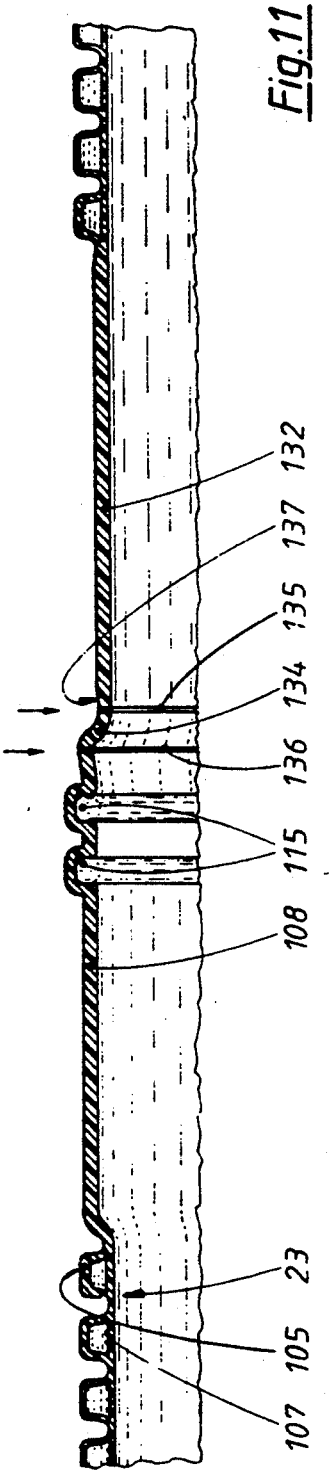

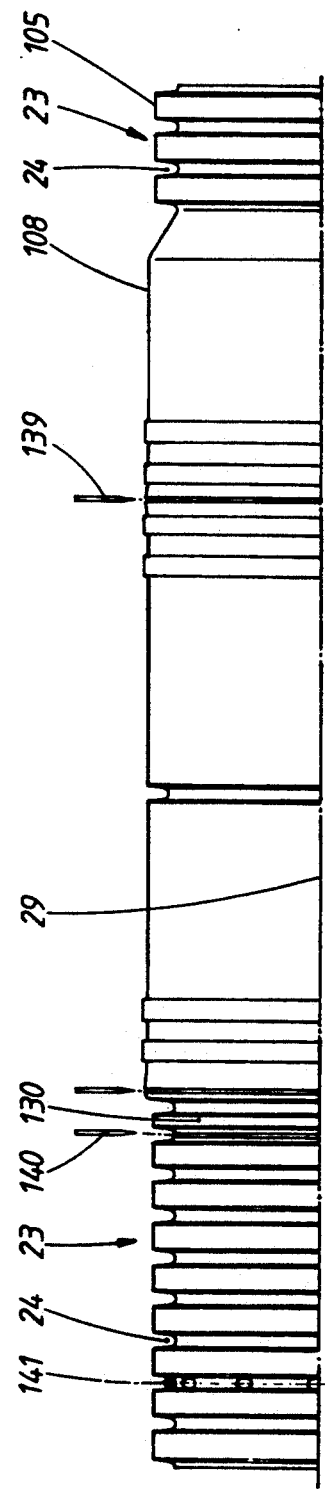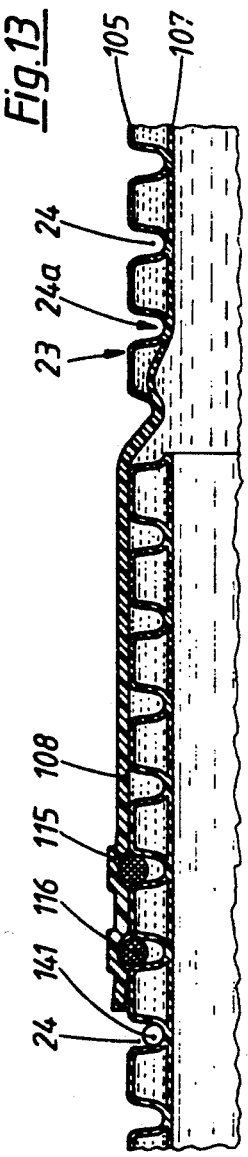

METHOD AND APPARATUS FOR THE CONTINUOUS MANUFACTURE OF A COMPOUND PIPE WITH A PIPE SOCKET

FIELD OF THE INVENTION

The invention relates to a method for the continuous manufacture of a compound pipe with a pipe socket, the compound pipe consisting of a smooth internal pipe and an external pipe provided with transverse grooves and welded together with the internal pipe, and an apparatus to put this method into practice, wherein half shells, which are provided with annular mold recesses, and of which two at a time combine as a pair on a molding path to form a mold with a central longitudinal axis, are arranged on a machine bed to be guided in a circuit and in the direction of production, wherein the mold recesses are connected to partial vacuum channels formed in the half shells, wherein an injection head of an extruder is arranged upstream of the molding path, wherein the injection head is provided with an external nozzle for the extrusion of an external tube and, downstream in the direction of production, with an internal nozzle for the extrusion of an internal tube and, at its rear end seen in the direction of production, with a temperature-regulating bell, wherein at least one gas duct opens out of the injection head between the external nozzle and the internal nozzle, and wherein a gas duct opens out of the injection head between the internal nozzle and the temperature-regulating bell.

BACKGROUND OF THE INVENTION

A method and an apparatus for the manufacture of a compound pipe of the species is known from EP 0 108 598 B1, in which the external tube is acted upon from inside by compressed gas, whereby it is forced into annular mold recesses of the half shells. Via the wall of a temperature-regulating bell the internal tube is pressed against the corrugations of the external tube and welded together with it. For the production of a pipe socket within the continuous pipe, the external tube is pressed into a cylindrical, smooth socket recess in the half shells. The internal tube is molded in parallel at a corresponding distance. Then—the internal tube and the external tube still being thermally plastic—one of the two tubes is punched through and a mechanical pressure is exercised from inside on the internal tube, so that the latter is pressed against the external tube and welded together with the latter. In terms of construction such an apparatus is of considerable expense. Moreover, practice has shown that a reliable welding connection and a true-to-size production of a pipe socket is not possible.

A method for the manufacture of compound pipes is known from PCT WO 90/14208, in which an external tube is pressed into annular mold recesses of the half shells without this being specified in detail. By means of a partial vacuum exercised on its inside an internal tube is held on a temperature-regulating bell and is welded together with the external tube in known manner. For the production of sockets, the internal tube is acted upon by compressed gas from a gas duct located downstream of an internal nozzle and is pressed all-over against the external tube and welded together with the latter. A defined connection between the internal and the external tube is not assured.

EP 0 385 465 A2 teaches a method for the manufacture of compound pipes with an integral socket, a normal corrugated compound pipe being widened at one end to form a socket and the corrugation at the other end being reduced to form a spigot.

A method and an apparatus for the manufacture of a compound pipe with an integral socket is known from PCT WO 88/05377, in which an external tube is sucked by a partial vacuum into the annular recesses of the half shells and in which, section by section, an internal tube is welded together with the corrugated external tube. To form a pipe socket, a socket recess, into which the external tube is sucked, is provided in at least one pair of half shells. When the external tube has been completely molded into the pipe socket, then the internal tube is pressed by compressed air against the external tube and is welded together with the latter. To this end a temperature-regulating bell is provided with an annular gas duct at a considerable distance behind an internal nozzle extrusion-molding the internal tube. This gas duct is acted upon by compressed gas, when the entire pipe socket molded from the external tube and the to-be-deformed portion of the internal tube are located on the temperature-regulating bell. It is not ensured by this construction that the welding together of the internal tube and the external tube in the vicinity of the pipe socket is reliably performed.

SUMMARY OF THE INVENTION

It is an object of the invention to create a method and an apparatus for the continuous manufacture of compound pipes with pipe sockets, whereby high solidity of the pipe socket is ensured at a low cost.

This object is attained in accordance with the invention by the features which consist in that an external tube is extruded, in that, by a partial vacuum applied from the outside, the external tube is provided with a corrugation with transverse grooves, in that an internal tube is extruded into the external tube, in that at a pressure above atmospheric gas is blown into the space between the external tube and the internal tube, in that the internal tube is pressed against the corrugation troughs of the external tube, where it is welded together with the external tube, in that at predetermined intervals the external tube is widened by a partial vacuum applied from the outside to form an essentially smooth-walled, about cylindrical pipe socket, in that the space between the external tube and the internal tube is vented, and in that the internal tube is acted upon from the inside by gas at a pressure above atmospheric and while being widened is forced with its full surface against the external tube. The combination of, on the one hand, gas being blown at a pressure slightly above atmospheric into the space between the external tube and the internal tube during the manufacture of the normal corrugated compound pipe, while this space is vented during the widening of the external tube and the internal tube to form a pipe socket, the pressing of the internal tube against the external tube in the socket area taking place by pressure acting from inside of the internal tube, ensures that an all-over welding together of the internal tube and the external tube is achieved. This is especially important, because the pipe sockets are subject to particularly high solidity requirements, which are especially difficult to comply with, since, in the vicinity of the pipe socket, the pipe does not receive the high solidity and rigidity from its corrugated structure as a compound pipe.

As a result of the further development according to which, while the external tube and the internal tube are widened to form the pipe socket, the external tube and the internal tube are extruded to have thicker walls than during the manufacture of the compound pipe provided with transverse grooves, the total wall thickness in the vicinity of the pipe socket can be increased as compared to the normal corrugated compound pipe, this measure being known per se from PCT WO 88/05377.

It is assured that the method according to the invention is reliably performed by simple measures, in that at least one pair of half shells is provided with a socket recess, in that the at least one gas duct is connected to a valve, which can be changed over to gas at a pressure above atmospheric and to venting, in that the gas duct is connected to a valve, which can be changed over to gas at a pressure above atmospheric, and in that switches are provided which trigger the valves in dependence on the position of the socket recess relative to the gas duct and/or the at least one gas duct. The independent adjustability of the widths of the external nozzle and the internal nozzle allows different wall thicknesses of the external pipe and the internal pipe to be run and these wall thicknesses to be modified depending on the field of application of the pipe to be manufactured. If, for instance, a pipe is requested to bear high external pressures, then an increased wall thickness of the external pipe must be set; if the pipe is exposed to high abrasion from inside, then the internal pipe must be made more thick-walled. When the external nozzle and/or the internal nozzle have a nozzle ring, which is guided on the injection head displaceably in the direction of production and which is adjustable in the direction of production by means of a nozzle-ring nut engaging with an exterior thread on the injection head, and, in particular when the nozzle-ring nut and the nozzle ring are connected with each other by a rotary connection, it is assured that, upon adjustment of the nozzle width, no frictional forces arise between the associated part of the injection head and the nozzle ring, since the nozzle ring need not be rotated in relation to the injection head. Only the nozzle-ring nut, which is at a greater distance from the nozzle than the nozzle ring, is rotated. In this case, a high-temperature resistant lubricant should be arranged at the revolving joint, i.e. in the internal groove.

Further features, details and advantages of the invention will become apparent from the ensuing description of preferred exemplary embodiments taken in conjunction with the drawing.

BRIEF DESCRIPTION OF THE DRAWING

FIG. 2 is a vertical longitudinal section through the injection head of the apparatus, FIG. 3 is a longitudinal section through a part of the injection head at the start of the manufacture of a pipe socket in a compound pipe, FIG. 4 is a representation according to FIG. 3 at the end of the manufacture of the pipe socket, FIG. 5 shows an internal nozzle ring with an internal-nozzle-ring nut at the start of their assembly, FIG. 6 shows the internal nozzle ring and the internal-nozzle-ring nut after their being assembled, FIG. 7 is a cross-section through a half shell in the vicinity of a socket recess, FIG. 8 is a partial view of a control member arranged on a half shell in cooperation with switches according to the arrow VIII in FIG. 3, FIG. 9 is a section through FIG. 8 according to section line IX—IX in FIG. 8, FIG. 10 shows a modified embodiment of an apparatus with a recess for the production of a spigot in a compound pipe, FIG. 11 shows a compound pipe, in which on the one hand the spigot and on the other hand the socket are continuously produced, FIG. 12 shows a compound pipe, in which a pipe socket and a double socket are formed, and FIG. 13 shows a pipe connection with a pipe socket according to the invention.

DESCRIPTION OF THE PREFERRED EMBODIMENTS

Figure 1:
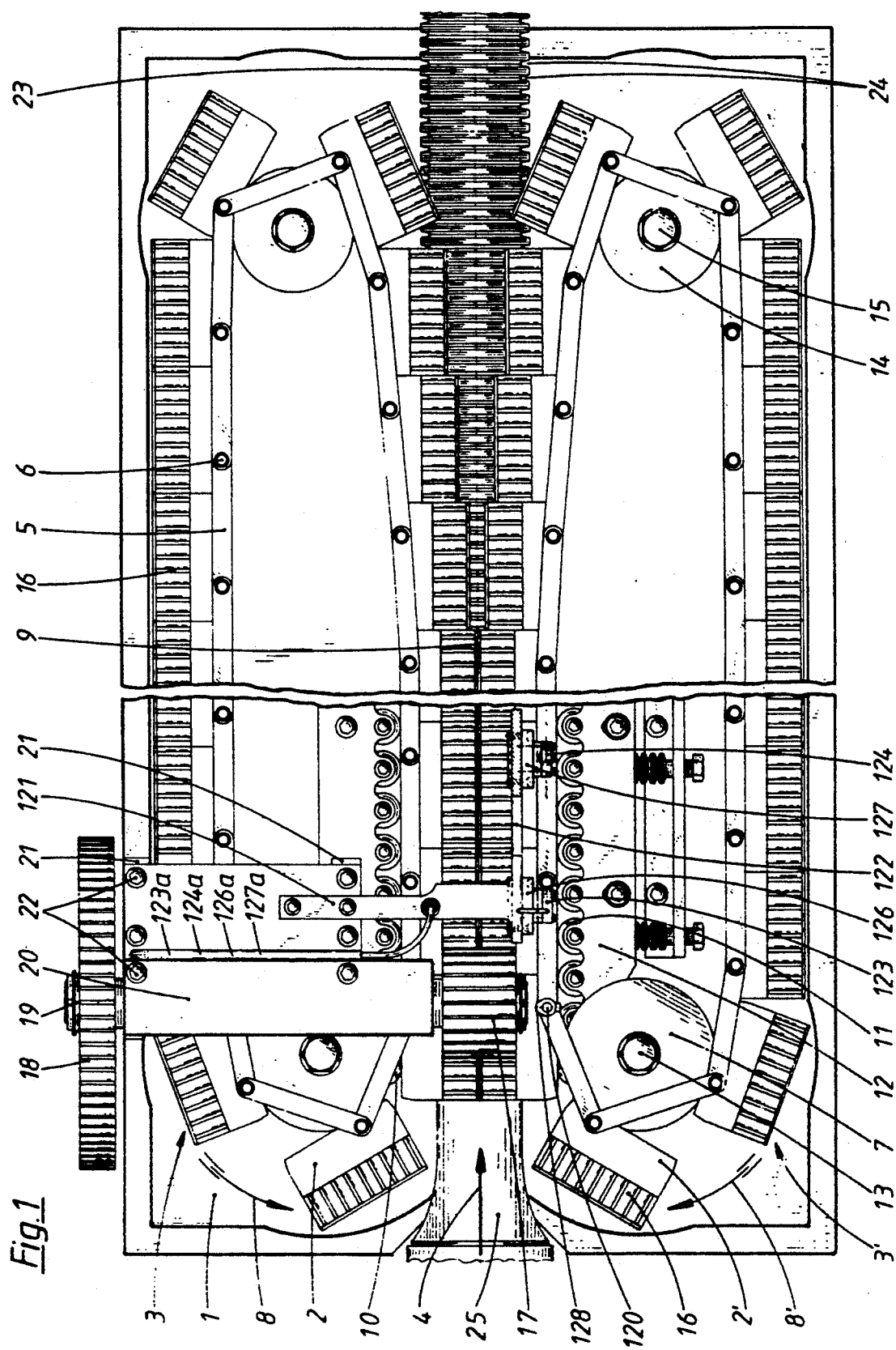
FIG. 1 is a plan view of an apparatus for the production of compound plastic pipes.

As seen in FIG. 1, the apparatus for the production of plastic compound pipes with transverse grooves comprises a machine bed 1, on which half shells 2, 2' are arranged, which are joined together respectively in two so-called chains 3, 3'. For this purpose, a fish-plate 5 is coupled by means of a coupling bolt 6 to each half shell 2, 2' in the outer region thereof and downstream thereof with respect to the direction 4 of production, each fish-plate 5 being attached to the succeeding half shell 2, 2' at the corresponding position, likewise by means of another coupling bolt 6. The chains 3, 3' thus formed, at their rear end with respect to the direction 4 of production, are carried around guide wheels which serve as and may be designated feed rollers 7. The individual half shells 2, 2' are swung into a molding path 9 by the revolution of the chains 3, 3' in the direction of the arrows 8, 8'. In this path 9 two half shells 2, 2' at a time are united to a half shell pair, so that an unbroken succession of pairs of half shells mutually abut in the direction 4 of production. In order to achieve rapid closure of the half shells 2, 2' into a parallel and adjoining orientation, so-called closing rollers 10 are provided, which bring the rear ends of the half shells 2, 2', referred to the direction 4 of production, together in accelerated fashion.

In the molding path 9 itself, the mutually abutting half shells 2, 2' are pressed together by means of guide rollers 11, which are rotatably mounted in guide rails 12. The feed rollers 7 are rotatably mounted on the machine bed 1, referred to the direction 4 of production, return rollers 14, likewise serving as guide wheels, are rotatably mounted on axle bearings 15, around which the chains 3, 3' are guided and returned to the feed rollers 7. As can be seen in FIG. 1, the guide rails 12 with the guide rollers 11 terminate after the length of several half shells 2, 2' and before the return rollers 14, so that the half shells 2, 2' can be displaced away from each other transversely of the direction 4 of the production while remaining parallel to each other, before they are guided around the return rollers 14.

On the upper side of the half shells 2, 2' there is provided a set of teeth 16, and the two sets of teeth 16 of the half shells 2, 2' which are arranged in abutting pairs match each other, so that a common pinion 17 can engage in the teeth 16 from above, and push the half shells 2, 2' along the molding path 9 as a closed mold. This drive pinion 17 is driven in conventional manner by a motor (not shown) through a drive gear wheel 18 which is fixedly mounted on a shaft 19, the shaft in turn carrying the drive pinion 17. The shaft 19 is housed in a bearing 20, which is set apart from the machine bed 1 by means of spacing pieces 21 and firmly fixed in relation to the machine bed 1 by means of screws 22.

In the illustrated apparatus, plastic pipes 23, namely so-called compound pipes, having among other things transverse profile features, i.e. with grooves 24 extending around their girth, are produced.

The pipes 23 will be described in more detail in the following. For this purpose an extruder is provided, of which only the injection head 25 to be described in more detail in the following is shown. The apparatus thus far described is known, for example, from U.S. Pat. No. 4,492,551 and from U.S. Pat. No. 5,141,427.

The injection head 25 is secured to a connecting piece 27 of the extruder (not shown) by means of screws 26. It has a substantially ring-shaped nozzle body 28, to which all the essential parts of the injection head are secured. Concentrically of a common central longitudinal axis 29 of the injection head 25 this nozzle body has an annular collar 30 projecting in the direction 4 of production. An internal mandrel 32 is secured within this annular collar 30 by means of an internal thread connection 31. An external mandrel 34 is attached on the outer circumference of the annular collar 30 by means of an external thread connection 33. Finally and again concentrically of the axis 29, an external nozzle jacket 35 is attached to the nozzle body 28 by means of an adjusting ring 36 and by means of the screws 26.

The internal mandrel 32 and the external mandrel 34 define between them an internal channel 37, while the external mandrel 34 and the external nozzle jacket 35 define between them an external channel 38. The internal channel 37 and the external channel 38 are connected to an injection channel 39 coming from the extruder—as seen in FIG. 2. So as to attain a continuous flow of the plastic melt from the extruder into the channels 37, 38, a guide cone 40 is arranged on the nozzle body 28 and directed into the injection channel 39 against the direction 4 of production.

In the nozzle body 28 the internal channel 37 is interspersed by radially extending internal webs 41 and the external channel 38 is interspersed by external webs 42 equally extending radially relative to the axis 29, so that the nozzle body 28 is really one piece. As can be seen from FIG. 2, the internal channel 37 in the nozzle body 28 extends through the annular collar 30.

The internal mandrel 32 is provided with a line conduit 43 extending concentrically of the axis 29 and opening into a chamber 44 in the nozzle body 28. In this line conduit 43 a protecting tube 45 is arranged concentrically of the axis 29 and is insulated towards the internal mandrel 32 by an air gap 46. The protecting tube 45 itself is made from steel.

Supply hoses 47, 48, 49, 50, 51, 52, 53 are piloted through the protecting tube 45 in the line conduit 43. They are guided radially from outwards through the nozzle body 28 into the latter's chamber 44, to which effect approximately radially extending bores 54 reaching right into the chamber 44 are provided which of course intersperse the external webs 42 and the internal webs 41, so that the hoses 47 to 53 do not contact the melt transported in the channels 37 and 38. The hoses 47 to 53 are made of high-temperature-resistant plastic material such as polytetrafluoroethylene.

The external nozzle jacket 35 is oriented and arrested by means of adjusting screws 55 provided in the adjusting ring 36 and extending radially in relation to the axis 29. In the external mandrel 34 gas ducts 56 are formed extending in the direction 4 of production and connected to a supply channel 57 in the nozzle body 28, which extends approximately radially referred to the axis 29 and passes through the webs 42. Along a major part of its length the injection head 25 is surrounded by heatings 58, 59, so that a cooling down of the melt coming from the injection channel 39 and flowing through the channels 37, 38 be avoided.

The structure of the injection head 25 in the vicinity of its nozzles shown on the right in FIG. 2 is described in the following with simultaneous reference to FIGS. 3 and 4. An internal mandrel disk 60 expanding in the shape of a truncated cone in the direction 4 of production is arranged on the internal mandrel 32 and bears an internal mandrel formed as a temperature-regulating bell 62. On the side located inwards radially of the axis 29 this internal mandrel disk 60 delimits an internal nozzle 63 finishing the internal channel 37. On the external mandrel 34 an extension piece 64 is arranged by means of a thread connection 65 and, seen in the direction 4 of production, partially surrounds the internal mandrel disk 60, thus surrounding an extended portion of the internal channel 37 on the outside, namely as far as right ahead of the internal nozzle 63. On the side located radially outwards the latter is defined by an internal nozzle ring 66 arranged on the extension piece 64. The structure and the adjusting will be described more closely below.

The internal mandrel disk 60 is arranged on a suspension tube 68 extending concentrically of the axis 29 and which is connected with the internal mandrel 32 by means of a thread connection 61. The internal mandrel disk 60 is supported on a corresponding conical seat surface 70 at the free end of the internal mandrel 32 by means of a conical surface 69. To some minor extent the internal mandrel disk 60 can be adjusted radially relative to the axis 29 on this conical seat surface, whereby an adjusting step 71 can be formed, which is by all means smaller than 1 mm, but does not exceed 0.5 mm as a rule. For adjusting the internal mandrel disk 60 a conical adjustment ring 72 is provided bearing with a conical surface 73 against a conical seat surface 74 on the inside of the internal mandrel disk 60. While the conical surface 69 and the conical seat surface 70 taper in the direction 4 of production, the conical surface 73 and the associated conical seat surface 74 expand in the direction 4 of production. With its cylindrical inner surface 75 the conical adjustment ring 72 is guided on a spherical ring-shaped guide surface 76 of which the center 77 is located on the axis 29. Pressure adjusting screws 79 bear against a working face 78 of the conical adjustment ring 72 facing away from the conical surface 73 and are adjustably guided in abutments 80 which are in turn tightly connected with the suspension tube 68. By individually setting the adjusting screws 79, of which only one is illustrated, the conical adjustment ring 72 can be tilted on the spherical guide surface 76 to some minor extent, so that the angle of inclination a of its conical surface 73 is not identical along the entire circumference of the conical adjustment ring 72. Thus the internal mandrel disk 60 is adjusted at its support by means of the conical surface 69 and excentrically of the axis 29 on the spherical guide surface 76. So as to have this take place to the extent desired the average inclination of the conical surface 73 relative to the axis 29 is 45°; in like manner the inclination b of the conical seat surface 70 referred to the axis 29 is approximately 45°.

The concial surface 69 and the conical seat surface 74 are inclined one towards the other by an angle of 90°.

By adjusting the internal nozzle ring 66 in the direction of the axis 29 the basic width c of the internal nozzle 63 and to some minor extent a width c varying along its circumference is set. Due to the described radial adjustment of the internal mandrel disk 60 the width c of the internal nozzle 63 is set to a major extent along its circumference. Thus the width c of the internal nozzle 63 is adjustable to be exactly the same along its circumference. On the other hand it can also be adjusted to vary along its circumference.

The internal nozzle ring 66 is adjusted by means of an internal-nozzle-ring nut 81 in the direction 4 of production to set the width c of the internal nozzle 63. The internal-nozzle-ring nut 81 has an internal thread 82 supported on an external thread 83 of the extension piece 64. The threads 82, 83 are formed concentrically of the axis 29. The internal-nozzle-ring nut 81 has openings 84 extending radially to the axis 29 for engagement with a tool to rotate the nozzle-ring nut 81.

The internal-nozzle-ring nut 81 is connected with the internal nozzle ring 66 by means of a rotary connection 85 non-displaceable in the direction of the axis 29. On its side facing the internal nozzle ring 66 the nozzle-ring nut 81 has, to this effect, an undercut internal groove 86. The internal nozzle ring 66 has an eccentric annular web 87, of which the central axis 88 is displaced by an eccentricity e in relation to the axis 29. For the assembly, the internal nozzle ring 66 is moved by the eccentricity e in relation to the internal-nozzle-ring nut 81 and slipped into the latter, so that the eccentric annular web 87 takes its bearing in the internal groove 86. Then this unit of the internal nozzle ring 66 and the internal-nozzle-ring nut 81 is screwed on the external thread 83. With its cylindrical internal guide face the internal nozzle ring 66 is guided on a likewise cylindrical external guide face 90 of the extension piece 64. For setting the gap width c of the internal nozzle 63 only comparatively small forces are to be exerted on the internal nozzle ring 66, since the internal nozzle ring 66, when adjusted in the direction 4 of production, need not be rotated in relation to the external nozzle jacket 35. In this regard only extremely small frictional forces occur in this area. A high-temperature resistant lubricant is in the internal groove 86 for the largest possible reduction of the frictional forces in the rotary opening 85. As seen in FIGS. 5, 6, the nozzle rings 66 or 91, respectively, may be formed very short in the direction 4 of production, and clearly shorter than shown in FIGS. 3 and 4.

An external nozzle ring 91 is arranged on the external nozzle jacket 35 by means of an external-nozzle-ring nut 92 to be adjustable in the direction of the axis 29. The structuring is identical with that of the internal nozzle ring 66 with the internal-nozzle-ring nut 81, so that reference is made to the preceding description regarding the internal nozzle 63. On the side located radially outwards, the external nozzle ring 91 defines an external nozzle 93, of which the width f can be modified by the described adjustment in the direction of the axis 29.

Between the external nozzle 93 and the internal nozzle 63 arranged downstream in the direction 4 of production, the gas ducts 56 emerge from the injection head 25. The temperature-regulating bell 62 has an essentially cylindrical calibrating cylinder 94 of usual structure. The latter is arranged on a temperature-regulating cylinder 95, which is provided with a temperature-regulating channel 96 on its outer circumference. Via a heating-medium flow pipe 97 the channel 96 is supplied with a temperature-regulating agent, which is fed in via the supply hose 47 and discharged via the supply hose 51. The temperature-regulating channel 96 is usually in the form of a heating duct, a cooling duct (not shown) being arranged downstream of the latter in the direction 4 of production. A heat insulation 98 is arranged between the temperature-regulating bell 62 and the internal mandrel disk 60.

The temperature-regulating cylinder 95 is hollow and, in its cavity, has a gas chamber 99 which surrounds the suspension tube 68 and which is connected with the supply hose 50. By way of a gap-like gas channel 100 formed in the interface between the internal mandrel disk 60 and the temperature-regulating bell 62 the gas chamber 99 is connected with the mold space 101 formed between the shalf shells 2 and 2', respectively and the injection head 25 with the temperature-regulating bell 62. Directly behind the internal nozzle 93 seen in the direction 4 of production the gap-like gas channel 100 opens into the mold space 101.

As seen in FIGS. 3 and 4, annular mold recesses 102, which are in known manner connected to partial vacuum channels 103, are formed in the half shells of which only the half shells 2 are shown in these Figures.

The melt of plastic material supplied by the extruder through the injection channel 39 flows in part through the external channel 38 to the external nozzle 93, from which an external tube is extrusion-molded which, due to the partial vacuum, moves into the mold recesses 102 thus forming a tube provided with the transverse grooves 24. Correspondingly cooled down and cured it forms the corrugated external pipe 105 of the pipe 23.

Another part of the melt flows through the internal channel 37 towards the internal nozzle 63, from which exits a further tube, namely an internal tube 106, which gets on the calibrating cylinder 94. From the internal nozzle 63 in the direction 4 of production, the calibrating cylinder 94 widens slightly outwards until the internal tube 106 comes to bear against the corrugations troughs 24a of the external tube 104, where it is welded together with them. Once cooled down and cured, the internal tube 106 forms the internal pipe 107 of the compound pipe 23.

As seen in particular in FIGS. 3 and 4, the half shells 2, 2' are structured such that pipe sockets 108 are formed in each case at predetermined intervals within the continuously produced compound pipe 23. To this end an essentially cylindrical socket recess 109 having a smooth cylindrical wall 110 is formed in a pair of half shells 2, 2'. For the external tube 104 to rest completely smoothly against the wall 110 also in this portion, the partial vacuum channels 103 are not only connected with the mold recesses 102 by means of vacuum slits 111—as with the mold recesses 102—but, by means of annular vacuum slits 112, they are connected with the socket recess 109, so that over the entire circumference of the wall a partial vacuum is exercised on the outside of the external tube 104. The details may be seen in FIG. 7.

A portion of transition 113 is formed between the socket recess 109 and the mold recess 102' advancing in the direction 4 of production. Of course, the socket recess 109 can also extend over several half shells 2, 2' arranged one after the other. At the rear end—seen in the direction 4 of production—of the socket recess 109, mold slots 114 are provided, in which internal grooves 115 each to accommodate a packing ring 116 (FIG. 13)

are formed in the pipe socket 108. Further, a mold section 117 in the shape of a truncated cone follows up, in which an outwards opening spigot end 118 of the socket is formed. This is in turn followed by a portion of transition 119 which leads to the next mold recess 102 trailing in the direction 4 of production.

In spatially fixed association with the socket recess 109, a control member 120 is formed by a rod-shaped prolongation of a coupling bolt 6 and triggers various valves—in a way still to be described—so as to create different pressure conditions in the space between the external tube 104 and the internal tube 106 and/or within the internal tube 106. To this end an assembly bridge 121 is secured on the bearing 20 and has an assembly arm 122 which extends in the direction 4 of production above the half shells 2'. On this assembly arm 122 switches 123, 124 are arranged, which are to be actuated by the control member 120 and by means of which solenoid valves 125, 125a can be triggered. Further, switches 126, 127 arranged on the assembly arm 122 are actuated by the control member 120; by means of these switches different speeds of the drive motor (not shown) can be set. The switches 123, 124, 126, 127 are—as seen in FIGS. 3, 4, 8—actuated contactlessly, the contactless actuation of the switches 126, 127 taking place by means of a control cam 128. The switches 123, 124, 126, 127 are arranged to be adjustable in the direction 4 of production on the assembly arm 122, which is outlined by the arrows 129. Via lines 123a, 124a, 126a, 127a the 123, 124, 126, 127 are connected with a control unit 125b which processes the signals from the switches 123, 124, 126, 127 and passes corresponding control signals to the solenoid valves 125, 125a. By a pressure source (not shown) the solenoid valves 125, 125a are supplied with compressed air at a pressure p which is higher than the still-to-be-specified initial pressures of the solenoid valves 125, 125a.

The pressure in the gap-like gas duct and thus within the internal tube 106 is triggered by way of the solenoid valve 125, whereas the pressure in the gas ducts 56 and thus in the space between the external tube 104 and the internal tube 106 is triggered by the solenoid valve 125a.

During the manufacture of a normal corrugated compound pipe 23 in the form shown on the right in FIG. 3 a pressure p1 of about 1.05 to 1.15 bar, i.e. a slight overpressure of 0.05 to 0.15 bar, is brought on the gap-like gas duct 100 by the solenoid valve 125. Simultaneously, a pressure p2 of about 1.2 to 1.3 bar, i.e. a likewise slight, but higher overpressure of 0.2 to 0.3 bar, is brought on the gas ducts 56. The slight overpressure within the internal tube 106 prevents the internal tube 106 from sticking to the calibrating cylinder 94 before being welded together with the external tube 104. The slightly higher overpressure between the external tube 104 and the internal tube 106 ensures that the internal tube bulges outwards when the tubes 104, 106 welded together at the corrugation troughs 25a to form a corrugated compound pipe 23 cool down. Exact atmospheric pressure ensues when the tubes 104, 106 cool down.

When, right at the moment shown in FIG. 3, the portion of transition 113 gets in the vicinity of the gap-like gas duct 100, then the control member 120 reaches the first switch 126—seen in the direction 4 of production—which reduces the advancing speed of the mold formed by the half shells 2, 2', so that—at a constant performance of the extrudermore melt per unit of length of the to-be-produced compound pipe 23 is supplied to the internal nozzle 63 and the external nozzle 93. This results in that the external tube 104 and the internal tube 106 become thicker, as can be seen in particular in FIG. 4. At the same time the solenoid valve 125a is connected with the atmosphere so that an atmospheric pressure p3 prevails in the space between the external tube 104 and the internal tube 106 and in particular the air can escape outwards. Simultaneously the solenoid valve 125 is switched from p1 to a higher pressure p4 of about 1.2 to 1.45 bar, i.e. to an overpressure of about 0.2 to 0.45 bar, whereby the internal tube 106 is pressed outwards against the external tube 104. The latter is anyway sucked towards the wall 110 of the socket recess 109 by the partial vacuum of 0.7 to 0.3 bar in the annular vacuum slits 112. From inside works the overpressure forced in through the gap 100, so that resting against the wall 110 of the socket recess 109 the external tube 104 and the internal tube 106 are welded together full surface. The total wall thickness in the vicinity of the pipe socket 108 is greater than in the corrugated portion, so that the rigidity and the resistance to pressure of the pipe socket 108 is the same as in the corrugated portion. At the end of the manufacture of the socket according to FIG. 4 the control member 120 first reaches the switch 127, which changes the drive motor again to a higher speed, so that again less melt is supplied per unit of length of the manufactured compound pipe 23. Directly afterwards the switch 124 is actuated adjusting the solenoid valves 125 and 125a back to the conditions described above with the pressures p1 and p2. The piece 130 of pipe produced in the portion of transition 119 is cut out.

A variant is shown in FIG. 10 with a spigot being produced instead of a pipe socket, which spigot has a reduced outside diameter and is formed for insertion in a socket or any other pipe joint element. In this case a spigot recess 131 is provided in the respective half shell 2 or 2' in the place of a socket recess, and by comparison to the diameter of the calibrating cylinder 94 the diameter of this spigot recess is greater only by double the wall thickness of the spigot 132 to be produced. When the spigot recess 131 moves over the gap-like gas duct 100 the solenoid valve 125 must be triggered by the switch 123 such that it is connected with the atmosphere. The solenoid valve 125 is simultaneously—as for the manufacture of the socket—adjusted such that it is open towards the atmosphere, so that here too the air can be forced outwards out of the space between the external tube 104 and the internal tube 106. The welding together of the external tube 104 and the internal tube 106 only takes place by the two tubes being pressed together between the calibrating cylinder 94 and the wall 133 of the spigot recess 131. Here, too, the speed of the mold has been reduced by the drive motor being correspondingly triggered by the switch 126, so that more melt per unit of length of the to-be-produced pipe gets into the spigot 132, so that the latter's wall thickness is greater than the sum of the wall thicknesses of the external tube 105 and the internal tube 107.

FIG. 11 shows how a compound pipe 23 having a spigot 132 and—directly following the latter—a pipe socket 108 is continuously manufactured in one train. The piece 134 of pipe at the transition from the spigot 132 to the pipe socket 108 is cut out as waste by two saw cuts 135, 136. As seen in FIG. 11, the spigot 132 has a slightly tapering entering cone 137 at its free end. For the continuous manufacture of a compound pipe 23 with a spigot 132 on the one hand and with a pipe socket 108 on the other hand, an additional switch not shown in the drawing must be provided, by means of which, for the transition from the spigot 132 to the pipe socket 108, the solenoid valves 125, 125a change the pressure conditions in the way as specified above.

FIG. 12 illustrates a compound pipe 23 having a pipe socket 108 on the one hand and having an additional double socket 138—prior to the renewed transition into the corrugated compound pipe 23. This double socket 138 is cut out by saw cuts 139, 140 and is suited as an accessory, i.e. for the connection of two compound pipes that have no integral pipe socket 108. Of course, here too a piece 130 of the pipe is cut out as waste.

It is shown in FIGS. 12 and 13 that warted projections 141 are formed in a transverse groove 24 and serve to mark how far a compound pipe 23 can be entered into a pipe socket 108 for a solid connection to be assured in the vicinity of the pipe socket.

What is claimed is:

1. A method for the continuous manufacture of a compound pipe (23) with a pipe socket (108), the compound pipe (23) consisting of a smooth internal pipe (107) and an external pipe (105) provided with transverse grooves (24) and welded together with the internal pipe (107), comprising the following steps:

an external tube (104) is extruded into traveling molds (2, 2');

by a partial vacuum applied from the outside of the traveling molds (2, 2'), the external tube (104) is provided with a corrugation with transverse grooves (24);

an internal tube (106) is extruded into the external tube (104);

gas at a first pressure (p2) above ambient pressure (p3) is blown into the space between the external tube (104) and the internal tube (106);

the internal tube (106) is pressed against corrugation troughs (24a) of the external tube (104), where it is welded together with the external tube (104);

at predetermined intervals the external tube (104) is widened by a partial vacuum applied from the outside of the traveling molds (2, 2') to form an essentially smooth-walled, about cylindrical pipe socket (108);

a space between the external tube (104) and the internal tube (106) is vented by connecting said space with the atmosphere; and the internal tube (106) is acted upon from the inside by gas at a second pressure (p4) above ambient pressure (p3) and while being widened is forced with its full surface against the external tube (104).

2. A method for the continuous manufacture of a compound pipe (23) with a pipe socket (108), the compound pipe (23) consisting of a smooth internal pipe (107) and an external pipe (105) provided with transverse grooves (24) and welded together with the internal pipe (107), comprising the following steps:

an external tube (104) is extruded into traveling molds (2, 2');

by a partial vacuum applied from the outside of the traveling molds (2, 2'), the external tube (104) is provided with a corrugation with transverse grooves (24);

an internal tube (106) is extruded into the external tube (104);

gas at a first pressure (p2) above ambient pressure (p3) is blown into the space between the external tube (104) and the internal tube (106);

the internal tube (106) is pressed against corrugation troughs (24a) of the external tube (104), where it is welded together with the external tube (104);

at predetermined intervals the external tube (104) is widened by a partial vacuum applied from the outside of the traveling molds (2, 2') to form an essentially smooth-walled, about cylindrical pipe socket (108);

a space between the external tube (104) and the internal tube (106) is vented by connecting said space with the atmosphere;

the internal tube (106) is acted upon from the inside by gas at a second pressure (p4) above ambient pressure (p3) and while being widened is forced with its full surface against the external tube (104); and while the external tube (104) and the internal tube (106) are widened to form the pipe socket (108), the external tube (104) and the internal tube (106) are extruded to have thicker walls than during the manufacture of the compound pipe (23) provided with transverse grooves (24), the increasement in the wall thickness being generated by reducing the advancing speed of the traveling molds (2, 2').

3. An apparatus for the continuous manufacture of a compound pipe (23) with a pipe socket (108), the compound pipe (23) consisting of a smooth internal pipe (107) and an external pipe (105) provided with transverse grooves (24) and welded together with the internal pipe (107), wherein mold means traveling in a direction of production (4) are provided by serially arranged, traveling half shells (2, 2'), said half shells (2, 2'), which are provided with annular mold recesses (102), and of which two at a time combine as a pair on a molding path (9) to form a mold with a central longitudinal axis (29), being arranged on a machine bed (1) to be guided in a circuit and in the direction (4) of production, wherein the mold recesses (102) are connected to a partial vacuum source via partial vacuum channels (103) formed in the half shells (2, 2'), wherein an injection head (25) of an extruder is arranged upstream of the molding path (9), wherein the injection head (25) is provided with a first ring-shaped nozzle (93) for the extrusion of an external tube (104) into the mold formed by the half shells (2, 2') and, downstream in the direction (4) of production, with a second ring-shaped nozzle (63) for the extrusion of an internal tube (106) into the external tube (104) and, at its rear end seen in the direction (4) of production, with a temperature-regulating bell (62), wherein at least one first gas duct (56) is provided in the injection head (25) opening out of the injection head (25) between the first nozzle (93) and the second nozzle (63) for introducing gas under ambient and higher pressure into the space between the external and internal tube (104, 106), and wherein a second gas duct (100) is provided in the injection head (25) opening out of the injection head (25) between the first nozzle (63) and the temperature-regulating bell (62) for introducing gas under pressure into the internal tube (106), wherein at least one pair of half shells (2, 2') is provided with a socket recess (109) for forming the pipe socket (108), the at least one first gas duct (56) is connected to a valve (125a), which is switchable over between on the one hand a source of gas at a pressure (p2) above ambient pressure (p3) for pressurizing the space between the external and internal tube (104, 106) while forming the compound pipe (23) and on the other hand ambient pressure for venting said space while forming the pipe socket (108), the second gas duct (100) is connected to a valve (125) which is switchable over to a source of gas at a pressure (p4) above ambient pressure for pressurizing the internal tube (106) while forming the compound pipe (23) and pipe socket (108), and switches (123, 124) are provided which trigger the valves (125a, 125) in dependence on the position of the socket recess (109) relative to at least one of the second gas duct (100) and the at least one first gas duct (56).

4. An apparatus according to claim 3, wherein the switches (123, 124) are arranged above the molding path (9) and are actuatable by at least one control member (120) connected with a half shell (2).

5. An apparatus according to claim 3, wherein the switches (123, 124) for the triggering of the valves (125a, 125) are associated with switches (126, 127) for the change-over of a drive motor for the half shells (2, 2').

6. An apparatus according to claim 3, wherein at least one pair of half shells (2, 2') is provided with a spigot recess (131) for the production of a spigot (132) on the compound pipe (23).

7. An apparatus according to claim 3, wherein the first nozzle (93) and the second nozzle (63) are adjustable in width (f, c).

8. An apparatus according to claim 7, wherein at least one of the first nozzle (93) and the second nozzle (63) have a nozzle ring (91, 66), which is guided on the injection head (25) displaceably in the direction (4) of production and which is adjustable in the direction (4) of production by means of a nozzle-ring nut (92, 81) engaging with an exterior thread (83) on the injection head (25).

9. An apparatus according to claim 8, wherein the nozzle-ring nut (81) and the nozzle ring (66) are connected with each other by a rotary connection (85).

10. An apparatus according to claim 9, wherein the rotary connection (85) is formed by an internal groove (86) and an eccentric annular web (87) engaging with the latter.

11. A method according to claim 1, wherein said internal tube (106) is pressed against said corrugation troughs (24a) of the external tube (104) by applying a third pressure (p1) above ambient pressure (p3) from the inner side of said internal tube (106).

12. A method according to claim 11, wherein said first and second pressures (p2 and p4) are higher than said third pressure (p1).

13. A method according to claim 2, wherein said internal tube (106) is pressed against said corrugation troughs (24a) of the external tube (104) by applying a third pressure (p1) above ambient pressure (p3) from the inner side of said internal tube (106).

14. A method according to claim 13, wherein said first and second pressures (p2 and p4) are higher than said third pressure (p1).

* * * * *

REEXAMINATION CERTIFICATE (3171st)
United States Patent [19]
Hegler et al.

[11] B1 5,320,797
[45] Certificate Issued Apr. 8, 1997

[54] METHOD AND APPARATUS FOR THE CONTINUOUS MANUFACTURE OF A COMPOUND PIPE WITH A PIPE SOCKET

[75] Inventors: Ralph-Peter Hegler, Bad Kissingen; Wilhelm Hegler, Goethestrasse 2, D-873o Bad Kissingen, both of Germany

[73] Assignee: Wilhelm Hegler, Bad Kissingen, Germany

Reexamination Request:
No. 90/004,035, Nov. 21, 1995

Reexamination Certificate for:
Patent No.: 5,320,797
Issued: Jun. 14, 1994
Appl. No.: 28,394
Filed: Mar. 9, 1993

[30] Foreign Application Priority Data

Mar. 31, 1992 [DE] Germany .................. 4210482

[51] Int. Cl.$^6$ .................................................. B29C 49/04
[52] U.S. Cl. .................. 264/511; 264/40.3; 264/40.7; 264/508; 264/515; 425/133.1; 425/336; 425/393; 425/396; 425/140; 425/532; 425/462
[58] Field of Search ................... 264/508, 511; 425/326.1

[56] References Cited

U.S. PATENT DOCUMENTS 4,808,098  2/1989  Chan et al. .
4,873,048  10/1989  Jarvenkyla .
5,296,188  3/1994  Lupke .

FOREIGN PATENT DOCUMENTS 61-148035  12/1984  Japan .
61-242829  4/1985  Japan .
61-261020  5/1985  Japan .

*Primary Examiner*—Jeffery R. Thurlow

[57] ABSTRACT

For the continuous manufacture of a compound pipe with a pipe socket including a smooth internal tube and an external tube provided with transverse grooves and welded together with the latter, an external tube and an internal tube are extruded, the latter into the external tube. While the normal compound pipe is manufactured, gas is blown at a slight overpressure into the space beteen the external tube and the internal tube. When the pipe socket is produced, this space is vented so that a full-surface bearing of the internal tube against the external tube is achieved, to which end the internal tube is acted upon from its inside by gas under pressure.

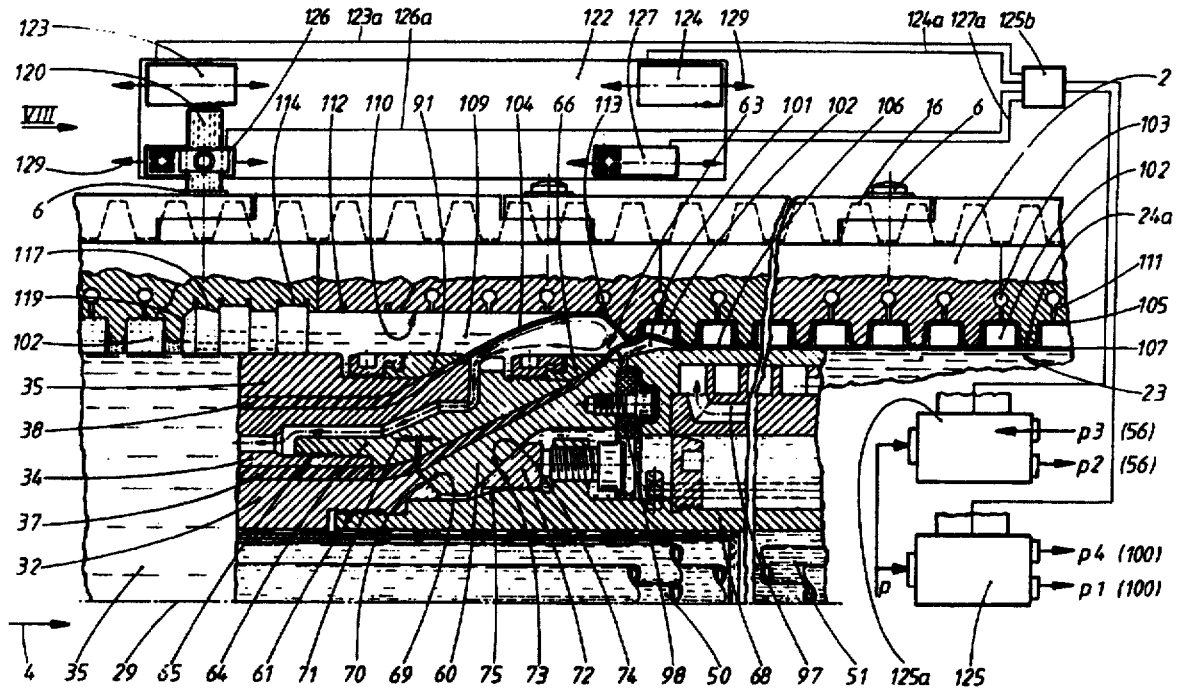

B1 5,320,797

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3 are determined to be patentable as amended.

Claims 4–14, dependent on an amended claim, are determined to be patentable.

1. A method for the continuous manufacture of a compound pipe (23) with a pipe socket (108), the compound pipe (23) consisting of *a pipe corrugated section and a pipe socket section*, a smooth internal pipe (107) *extending the length of said corrugated section* and an external pipe (105) provided with transverse grooves (24) [and] *to form the corrugated section and a surface to form the pipe socket section, the inner diameter of said socket section being greater than an inner diameter of said corrugated section the external pipe being* welded together with the internal pipe (107), comprising the following steps:

[an external tube (104) is extruded into traveling modes (2, 2');
by a partial vacuum applied from the outside of the]

*providing traveling molds (2, 2') having a mold corrugation section with a plurality of corrugating recesses (102) and a mold socket section adjacent said mold corrugation section, said mold socket section having an internal diameter sized to form a pipe socket;*

*extruding an external tube (104) into the traveling molds (2, 2');*

*applying a partial vacuum from outside of the traveling molds (2,2') to the corrugated recesses to provide the external tube (104) with a corrugation with transverse grooves (24;) providing* traveling molds (2,2')[, the external tube (104) is provided with a corrugation with transverse grooves (24);] *having a mold corrugation section with a plurality of corrugating recesses and a mold socket section adjacent said mold corrugation section, said mold socket section having an internal diameter sized to form a pipe socket;*

*connecting a partial vacuum to the corrugating recesses;*

*extruding an external tube into said traveling mold to provide said corrugating recesses with said partial vacuum to form said corrugations with transverse grooves;*

*extruding* an internal tube (106) [is extruded] into the external tube (104);

*blowing* gas at a first pressure (p2) above ambient pressure (p3) [is blown] into [the] *a* space between the external tube (104) and the internal tube (106);

*pressing* the internal tube (106) [is pressed] against corrugation troughs (24a) of the external tube (104)[, where it is welded together with] *and welding the internal tube (106) to* the external tube (104);

*shutting off said first pressure and feeding said external tube and said internal tube to said socket section;* at predetermined intervals *widening* the external tube (104) [is widened] by *applying* a partial vacuum [applied] from the outside of the traveling molds (2, 2') *to said mold socket section to hold said external wall against an inner surface of said mold socket section* to form an essentially [smooth-walled,] *smooth-wall* about cylindrical pipe socket (108);

*venting* a space between the external tube (104) and the internal tube (106) [is vented] by connecting said space with the atmosphere; and

*applying gas at a second pressure (p4) above ambient pressure (p3) in said mold socket section to said internal tube to press the internal tube against said external tube to weld said internal tube to said external tube wherein* the internal tube (106) is acted upon from the inside by *said* gas at [a] *said* second pressure (p4) above ambient pressure (p3) and while being widened is forced with its full surface against the external tube (104) *to provide the inner diameter of the pipe socket greater than the inner diameter of the pipe corrugated section.*

2. A method for the continuous manufacture of a compound pipe (23) with a pipe socket (108), the compound pipe (23) consisting of a smooth internal pipe (107) and an external pipe (105) provided with transverse grooves (24) and welded together with the internal pipe (107), comprising the following steps:

*providing traveling molds (2,2') having a mold corrugation section with a plurality of corrugating recesses (102) and a mold socket section adjacent said mold corrugation section, said mold socket section having an internal diameter sized to form a pipe socket;*

*extruding* an external tube (104) [is extruded] into *the* traveling molds (2, 2');

[by] *applying* a partial vacuum [applied] from [the] outside of the traveling molds (2, 2')[,] *to the corrugated recesses to provide* the external tube (104) [is provided] with a corrugation with transverse grooves (24);

*extruding* an internal tube (106) [is extruded] into the external tube (104);

*blowing* at a first pressure (p2) above ambient pressure (p3) [is blown] into [the] *a* space between the external tube (104) and the internal tube (106);

*pressing* the internal tube (106) [is pressed] against corrugation troughs (24a) of the external tube (104)[, where it is welded together with] *and welding the internal tube (106) to* the external tube (104);

at predetermined intervals *widening* the external tube (104) [is widened] by *applying* a partial vacuum [applied] from the outside of the traveling molds (2, 2') *to the mold socket section* to form an essentially [smooth-walled,] *smooth-wall* about cylindrical pipe socket (108);

*venting* a space between the external tube (104) and the internal tube (106) [is vented] by connecting said space with the atmosphere;

*applying gas at a second pressure (p4) above ambient pressure (p3) to said internal tube in said mold socket section to press the internal tube against said external tube and to weld said internal tube to said external tube wherein* the internal tube (106) is acted upon from the inside by *said* gas at [a] *said* second pressure (p4) above ambient pressure (p3) and while being widened is forced with its full surface against the external tube (104) *to provide an inner diameter of the pipe socket greater than the inner diameter of the pipe corrugated section;* and while the external tube (104) and the internal tube (106) are widened to form the pipe socket (108), the external tube (104) and the internal tube (106) are extruded to have thicker walls than during the manufacture of the compound pipe (23) provided with transverse grooves (24), the increasement in the wall thickness being generated by reducing the advancing speed of the traveling molds (2, 2').

3. An apparatus for the continuous manufacture of a compound pipe (23) with a pipe socket (108), the compound pipe (23) consisting of a smooth internal pipe (107) and an external pipe (105) provided with transverse grooves (24) and welded together with the internal pipe (107), *comprising:*

[wherein] mold means traveling in a direction of production (4) [are] provided by serially arranged, traveling half shells (2, 2'), said half shells (2, 2'), which are provided with *half* annular mold recesses [(102)], and of which two at a time combine as a pair on a molding path (9) to form a mold *with annular mold recesses (102) for forming said transverse grooves (24) and* with a central longitudinal axis (29), being arranged on a machine bed (1) to be guided in a circuit and in the direction (4) of production,

[wherein] the mold recesses (102) are connected to a partial vacuum source via partial vacuum channels (103) formed in the half shells (2, 2'),

[wherein] an injection head (25) of an extruder is arranged upstream of the molding path (9),

[wherein] the injection head (25) is provided with a first ring-shaped nozzle (93) for the extrusion of an external tube (104) into the mold formed by the half shells (2, 2') and, downstream in the direction (4) of production, with a second ring shaped nozzle (63) for the extrusion of an internal tube (106) into the external tube (104) and, at its rear end seen in the direction (4) of production, with a temperature-regulating bell (62),

[wherein] at least one first gas duct (56) is provided in the injection head (25) opening out of the injection head (25) between the first nozzle (93) and the second nozzle (63) for introducing gas under ambient and higher pressure into [the] *a* space between the external and internal [tube] *tubes* (104, 106), and

[wherein] a second gas duct (100) is provided in the injection head (25) opening out of the injection head (25) between the [first] *second* nozzle (63) and the temperature-regulating bell (62) for introducing gas under pressure into the internal tube (106),

[wherein]

at least one pair of half shells (2, 2') is provided with a socket recess (109) for forming the pipe socket (108),

*socket vacuum passageways (103, 112) to connect said socket recess (109) to a partial vacuum source to hold the external tube (104) on walls of the socket recess to form the pipe socket (108),* the at least one first gas duct (56) is connected to a valve (125a), which is switchable over between on the one hand a source of gas at a pressure (p2) above ambient pressure (p3) for pressurizing the space between the external and internal [tube] *tubes* (104, 106) while forming the compound pipe (23) and on the other hand ambient pressure for venting said space while forming the pipe socket (108), the second gas duct (100) is connected to a valve (125) which is switchable over to a source of gas at a pressure (p4) above ambient pressure for pressurizing the internal tube (106) while forming the compound pipe (23) *and providing the external pipe (105) with transverse grooves (24)* and pipe socket (108), and switches (123, 124) are provided which trigger the valves (125a, 125) in dependence on the position of the socket recess (109) relative to at least one of the second gas duct (100) and the at least one first gas duct (56).

\* \* \* \* \*